Nov. 29, 1938.         W. L. McGRATH         2,138,768
REFRIGERATION CONTROL SYSTEM
Filed Sept. 14, 1936

LOW   HIGH

Inventor
William L. McGrath.
By George H Fisher
Attorney

Patented Nov. 29, 1938

2,138,768

UNITED STATES PATENT OFFICE 2,138,768

REFRIGERATION CONTROL SYSTEM

William L. McGrath, St. Paul, Minn., assignor to Minneapolis-Honeywell Regulator Company, Minneapolis, Minn., a corporation of Delaware Application September 14, 1936, Serial No. 100,590

23 Claims. (Cl. 62—4)

The present invention relates to refrigeration systems and more particularly to those systems having a plurality of evaporator coils connected to a single refrigerant supply and back pressure reducing device such, for instance, as those systems commonly employed in small ice cream freezing and storage units.

In units of this type there is usually provided a freezing chamber in which the ice cream or other substance to be frozen is placed during the freezing operation, and a hardening and storage chamber in which the ice cream is placed after the freezing operation has been completed. Usually each chamber is provided with an individual evaporating coil and these coils are connected in parallel to a single compressing and condensing unit in order to avoid the extra expense of providing individual compressing and condensing units for each evaporator. This arrangement, while being relatively inexpensive, however, presents difficulties in control as the freezing chamber is normally out of operation due to the fact that the freezing process is relatively fast and the required amount of frozen substance to meet, for instance, a day's needs can be frozen in a much shorter period. On the other hand, the temperature in the hardening or storage chamber must continuously be maintained sufficiently low for storage purposes and at times must be maintained at an even lower temperature for the purpose of hardening a freshly frozen batch. As the compressor or other refrigerant supplying and back pressure reducing means must be sufficiently large to simultaneously carry the freezing load and the storage or hardening load, its operation must be limited when the freezing chamber is out of operation in order to prevent overcooling of the storage or hardening chamber. When, however, the freezing chamber is in operation, the compressor must be operated continuously or at full capacity in order to remove the necessary heat from the substance being frozen and to carry the storage or hardening cooling load. Therefore, when the freezing unit is placed into or out of operation, the operation of the compressor must be varied to meet the accompanying change in load.

In ice cream making units as above mentioned, the freezing evaporator is usually provided with a cut-off valve for placing it into and out of operation. When this valve is closed the compressor must operate only to carry the load of the storage chamber, while when the valve is open, the compressor must be operated continuously regardless of conditions in the storage chamber in order to carry the freezing load. It is important that the change in control of the compressor be made at the same time that the valve is actuated. Should the valve be opened without properly controlling the compressor, the proper freezing action will not take place, while should the compressor operation be increased for carrying the freezing load, without opening the valve, excessively low temperatures may be developed in the storage cabinet, and the desired freezing will not take place.

In ice cream making units as above described, the freezing chamber is provided with an agitator usually driven by an electric motor, and this agitator is operated during the freezing process. While it is important that this agitator be operated during the freezing operation, it sometimes happens that the attendants fail to start it with the inevitable result of a ruined batch.

Inasmuch as apparatus of this type is usually operated by persons who are not familiar with the principles of operation thereof, it often happens that the control valve for the freezing evaporator is opened without placing the compresor in continuous operation. Also, the operator may place the compressor in continuous operation without opening the freezing evaporator control valve. As before mentioned, the failure to perform either of these steps or to place the agitator in operation will result in improper operation and possibly a ruined batch of the mixture to be frozen.

One object of my invention, therefore, is to provide an arrangement wherein a system as mentioned may be completely shifted from storage or hardening operation to freezing operation by movement of a single control member, such member acting to simultaneously increase the operation of the compressor or other refrigerant supplying means, to open the freezing evaporator valve and to start the agitator motor when moved to freezing position; and to stop the agitator motor to reduce the operation of the compressor, and to close said valve when moved to storage or hardening position.

Another object of my invention is to provide a combined freezing and storage system with means for controlling the compressor or other refrigerant supplied and back pressure reducing means in accordance with the temperature in the storage or hardening cabinet when the freezing unit is out of operation and for operating the compressor susbtantially continuously or at increased capacity when the freezing unit is placed into operation.

A further object of my invention is to provide a system as mentioned above with a device for selectively maintaining a relatively high temperature in the hardening or storage cabinet when hardening is desired and for maintaining a relatively higher temperature when storage only is desired.

Another object of my invention is to provide a device for placing the freezing unit into or out of operation and which acts to cause the compressor to operate at reduced capacity when the freezing unit is out of operation and at an increased capacity when the freezing unit is in operation.

Another object is to provide a multiple refrigeration system with means for cutting in or out the operation of one of the evaporators and for simultaneously controlling the compressor to meet the accompanying change in load.

Other objects will appear as this description proceeds.

In accordance with one form of my invention, I employ a temperature controller responsive to the temperature in the storage or hardening cabinet, this controller being interposed in the actuating circuit for the compressor motor and acting to start or stop the compressor in order to maintain the desired temperature in said cabinet. The control valve for the freezing evaporator is actuated simultaneously, by means of a connecting linkage, with a switch for starting the agitator motor and with another switch which acts to shunt out the temperature controller. Thus, when the valve actuating member is moved to open the control valve, the temperature controller is short-circuited thus allowing continuous operation of the compressor regardless of the temperature in the storage or hardening cabinet, and also the agitator motor is placed into operation.

For a more detailed description of my invention reference is made to the accompanying drawing, in which.

Figure 1:
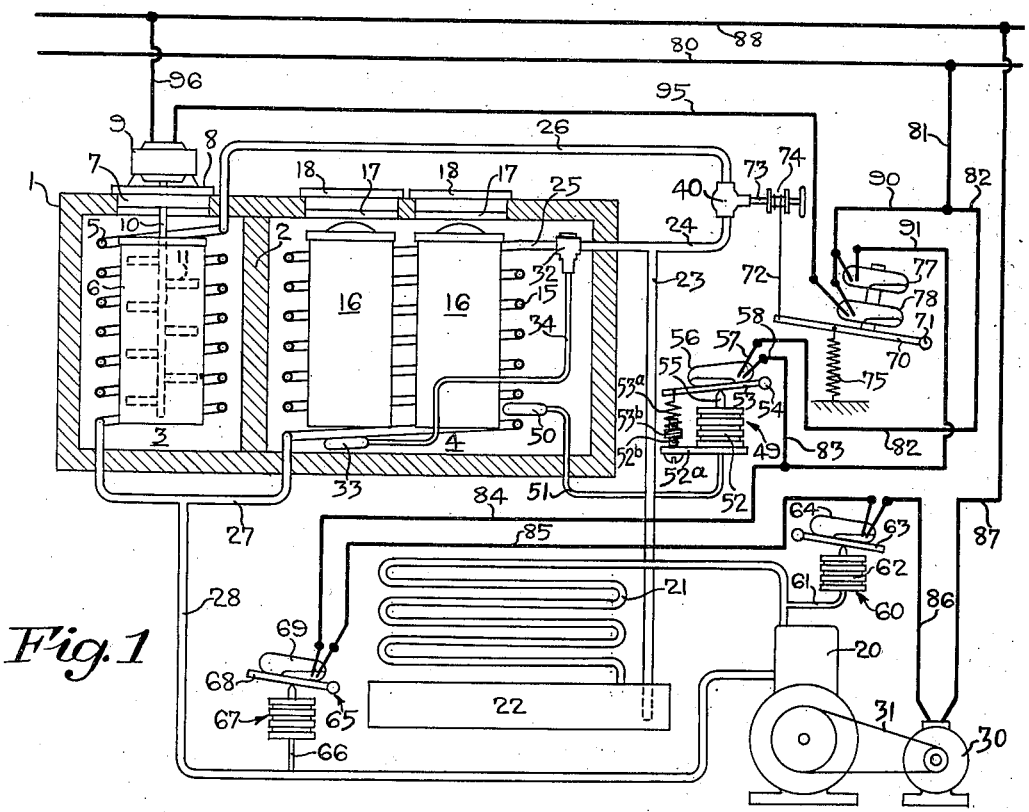
Figure 1 is a diagrammatic view of a combined freezing and storage system to which is applied a control means in accordance with one form of my invention.

Referring to Figure 1, reference character 1 indicates a combined ice cream freezing and storage unit such as may be employed in soda fountains. This unit is divided by a partition 2 into a freezing chamber 3 and a hardening and storage chamber 4. Located in freezing chamber 3 is an evaporator coil 5, this coil being arranged to surround a can 6 which is adapted to contain the mixture to be frozen. This can may be inserted into or removed from chamber 3 through an opening 7 formed in the top of said chamber. Covering opening 7 is a cover plate 8 which supports an electric motor 9. A shaft 10 extends vertically downward from the motor into the can 6, this shaft carrying a plurality of vanes 11 for agitating the mixture being frozen. Located in the hardening or storage chamber 4 is an evaporator coil 15, this coil being arranged to surround a plurality of cans 16 which are adapted to contain the frozen substance. These cans may be inserted into and removed from chamber 4 in the usual manner through openings 17 located thereabove, these openings being provided with the usual covers 18. After the freezing operation has been completed the cover plate 8 and the motor 9 are removed thus removing the agitator from can 6. The can 6 is then removed through opening 7 and is placed in the hardening chamber 4 in which hardening takes place. In order to harden the batch, the temperature in chamber 4 may be maintained at approximately $-10°$ F. After hardening has been completed the temperature in this chamber may be increased to approximately $+10°$ F. in order to allow the batch to remain sufficiently soft for ready dispensing.

In order to supply liquid refrigerant to said evaporator coils 5 and 15 and for removing evaporated refrigerant therefrom, I have shown a single compressing and condensing unit 20—21. The compressor 20 is connected at its discharge side to the condenser coil 21 which at its other end is connected to the usual receiver 22. Leading from the bottom of the receiver 22 is a pipe 23. This pipe branches at 24 into a first branch pipe 25 leading to evaporating coil 15, and into a second branch pipe 26 which leads to the evaporating coil 5. The discharge ends of evaporating coils 5 and 15 are connected to a header 27 which is connected to a suction line 28 which leads to the suction side of compressor 20. Interposed in the line 25 which leads to evaporating coil 15 is located an expansion valve 32. If desired this expansion valve may be of the thermostatic type. If such is the case, such valve is provided with a temperature responsive element 33 located on the end of the evaporator coil, this element taking the form of a bulb which is connected to the valve proper by means of a capillary tube 34. As such valves and their operation are well known in the art no detailed description is given here.

In order to control the operation of the freezing evaporator 5, I have shown a valve 40 located in the branch line 26 leading to this evaporator. If desired this valve may be designed not only to act as a cut-off valve but also to act as an expansion valve for the evaporator 5. By closing this valve, evaporating coil 5 may be completely placed out of operation. By opening it partly the coil may be caused to maintain a temperature suitable for hardening or storage, while by opening the valve still further the coil may be caused to be more completely filled with refrigerant, thereby reducing the temperature in chamber 5 sufficiently for the freezing operation.

In order to control the operation of the compressor when the freezing coil 5 is placed out of operation, I have shown a temperature controller 49 of known form. This temperature controller comprises a bulb 50 located in the chamber 4, this bulb being connected by a capillary tube 51 with an expansible and contractible bellows 52. Bulb 50, tube 51 and bellows 52 are filled with a vaporous substance. If the temperature increases in the cabinet 4 the vapor pressure of the vaporous substance will increase, causing expansion of bellows 52. Conversely, should the temperature in cabinet 4 drop, the vapor pressure of the vaporous substance will reduce, allowing bellows 52 to contract. Mounted adjacent bellows 52 is located a switch operating arm 53, this arm being pivoted at 54 and being operatively connected with bellows 52 through a stud 55 which is attached to said bellows. Mounted on arm 53 is a mercury switch 56 of known form. This switch comprises a sealed glass container containing a globule of mercury, and at one end having two electrodes 57 and 58. Upon increase in temperature in the cabinet 4, the bellows 52 will expand causing the mercury switch to be tilted so that the mercury globule contacts the electrodes 57 and 58 thereby closing an operating circuit for the compressor motor 30. Conversely, when the temperature in the cabinet decreases sufficiently the bellows will contract, thus causing the mercury switch to be tilted in the opposite direction thereby opening the compressor operating circuit.

If desired the temperature controller 49 may be provided with a device for adjusting the temperature which the controller will act to maintain in the hardening cabinet. One form of controller is illustrated. Attached to the free end of the mercury switch carrier 53 is a spring 53a. To the lower end of spring 53a is secured a sleeve 53b which is interiorly threaded to receive the adjusting screw 52b. Adjusting screw 52b is fitted through a base plate 52a to which the bellows 52 may be secured if desired. By rotating adjusting screw 52b the sleeve 53b may be raised or lowered thereby changing the tension on the spring 53a. When the tension of spring 53a is increased it tends to contract the bellows 52a. Contraction of this bellows will cause the mercury switch carrier to be tilted to break the compressor operating circuit. In order for the switch to be closed it will be necessary to develop a higher vapor pressure within the bellows 52 and this will require an increase in temperature in the cabinet 4. It will be seen, therefore, that increasing the tension on spring 53a will act to raise the temperature which the controller 49 will maintain in the cabinet 4. If so desired, the adjusting screw 52b may be provided with an operating handle in order to permit the temperature in the cabinet to be easily controlled by the attendant. In this manner, the temperature in cabinet 4 may be readily changed from that necessary for hardening to that suitable for storage, at the will of the attendant.

Located in the discharge line from the compressor is a high limit controller 60 of known form. This controller comprises a tube 61 connected at one end to the discharge line and at its other end to an expansible and contractible bellows 62, this bellows being arranged to operate a pivoted switch carrier 63 which carries a mercury switch 64. Upon an increase in head pressure above a maximum desired, the bellows 62 will expand sufficiently to tilt the mercury switch, causing it to open. This controller is interposed in the compressor operating circuit, as will be hereafter described, and thereby acts to stop the compressor whenever the head pressure should exceed a desired maximum. While it is not entirely necessary, I prefer to employ a low limit controller 65 for stopping the compressor when the suction pressure is pumped down to a predetermined minimum. This controller comprises a tube 66 which is connected at one end to suction line 28, and which at its other end is connected to an expansible and contractible bellows 67 which is arranged to vary the tilting of the pivoted mercury switch carrier 68. Mounted upon the switch carrier 68 is a mercury switch of known form, this switch being arranged to close its circuit when the bellows 67 is sufficiently expanded, and to open the circuit when the bellows 67 contracts to a predetermined point. Thus whenever the suction pressure is reduced sufficiently to allow adequate evaporation in the evaporating coils 5 and 15, the compressor will be shut down to prevent unnecessary operation.

Located below the valve 40 is a switch carrying arm 70. This arm is pivoted at one end at 71 and at its other end is connected to a flexible member 72. Mounted on the stem 73 of valve 40 is a reel 74 on which the flexible member 72 is wound. A spring 75 is connected to switch carrying arm 70 at one end and at its other end is connected to any suitable stationary member, this spring being arranged to urge the switch carrying arm 70 oppositely to the influence of the flexible member 72. Thus when the stem 73 of control valve 40 is turned in a clockwise manner to move the valve towards closed position, flexible member 72 is wound upon the reel thus causing the switch carrying arm 70 to be tilted in a clockwise direction. When valve 40 is opened, however, the flexible member 72 is unwound from reel 74 and the switch carrying arm 70 under the action of spring 75 is caused to tilt in the opposite direction. Mounted upon arm 70 are two mercury switches 77 and 78. One of these switches as hereafter described is in control of the agitator motor 9. The other switch in a manner hereafter described, operates to shunt out the temperature controlled switch 56 thereby allowing operation of the compressor regardless of the temperature in the hardening chamber 4. Both switches are arranged so that they close their respective circuits when the valve 40 is moved to a predetermined open position and they remain open when valve 40 is in a closed or partially closed position.

*Operation of Figure 1*

With the parts in the position shown, the freezing chamber is out of operation as indicated by valve 40 being closed and switches 77 and 78 being opened. The temperature in compartment 4 is also sufficiently low as the mercury switch 56 is in open position. The compressor 20 is therefore out of operation, and accordingly, the mercury switch 64 of the high limit controller 63 is in closed position. Also the non-operation of the compressor results in the suction pressure being sufficiently high to maintain switch 69 of low limit control 65 in closed position. Should the temperature in cabinet 4 increase, the bellows 52 will be caused to expand, thus tilting mercury switch 56 to closed position. This action will cause energization of the compressor motor through a circuit as follows: line wire 80, wire 81, wire 82, mercury switch 56, wire 83, wire 84, low side switch 69, wire 85, high side limit controller switch 64, wire 86, motor 30, and wire 87 to line wire 88. The compressor will then operate to circulate refrigerant through the evaporating coil 15 until the temperature in said chamber is lowered sufficiently to cause switch 56 to open or until the operating circuit for motor 30 is broken by either the high side limit control 60 or the low side controller 65. Should for any reason the high side pressure exceed a predetermined safe maximum pressure the bellows 62 will expand causing switch 64 to be tilted to open position thus stopping the compressor. Also, should the suction pressure be reduced to a predetermined extent, the bellows 67 will contract causing switch 69 to be tilted to open position thus stopping the compressor.

Should it be desired to place the freezing compartment into operation, valve 40 will be opened thus allowing refrigerant to pass into the evaporating coil 5. In opening this valve the reel 74 will be rotated to unwind the flexible member 72 thus causing the switch arm 70 and its mercury switches 77 and 78 to be tilted, causing said mercury switches to be closed. Upon closure of mercury switch 77, the compressor motor will be operated independently of the temperature controller 52 through the following circuit: line wire 80, wire 81, wire 90, mercury switch 77, wire 91, wire 84, mercury switch 69 of low limit controller 65, wire 85, mercury switch 64 of high limit controller 60, wire 86, compressor motor 30, and wire 87 to line wire 88. It will be observed that this operating circuit while being independent of the temperature controller 52, nevertheless contains the high and low side pressure controllers 60 and 65. Therefore, under this phase of operation, should a safe maximum pressure be exceeded in the compressor discharge line, the compressor will be caused to stop. Also, should the suction pressure be pumped down sufficiently low, the compressor will be likewise caused to stop.

As noted hereinbefore, the mercury switch 77 is tilted simultaneously with mercury switch 78. Thus, when mercury switch 77 is closed to place the temperature controller 52 out of operation, the mercury switch 78 is tilted towards closed position and closes an operating circuit for the agitator motor 9 as follows: line wire 80, wire 81, wire 90, mercury switch 78, wire 95, agitator motor 9, and wire 96 to line wire 88.

It will be seen, therefore, that when the valve 40 is closed thus placing evaporator 5 out of operation, the compressor will be controlled in accordance with the temperature existing in the hardening chamber by means of the temperature controller 49.

Also, when it is desired to operate the freezing apparatus, the valve 40 is moved towards open position, thus allowing refrigerant to flow into the freezing evaporator coil 5 and at the same time energizing agitator motor 9 and shunting out the temperature controller 52. With the controller 52 shunted out of the compressor control circuit the compressor motor will operate continuously even though the temperature in the hardening cabinet 4 is sufficiently low, thus allowing the continuous flow of refrigerant into the freezing evaporator 5 for performing the freezing operation. The compressor motor will operate continuously unless the high limit safety controller acts to break the actuating circuit for the compressor motor or unless the low limit controller acts to similarly stop the compressor.

If desired the freezing compartment 3 may be used for hardening or storage after the freezing operation has been completed, this being done by partly closing the valve 40 thus restricting the flow of refrigerant into the evaporating coil 5 thereby preventing the temperature in this compartment from falling below that desired. The valve 40 and the mercury switch carrier 70 may be so adjusted that the valve 40 may be opened a considerable extent before the mercury switches 77 and 78 are moved to closed position. Therefore, evaporator 5 can be operated in parallel with the evaporator 3, the controller 50 then acting to control the supply of refrigerant to both evaporators. By controlling the opening of valve 40 the proportion of refrigerant passed to each evaporator coil may be varied, thereby allowing compartment 3 to be maintained at a temperature lower, equal to or above the temperature in compartment 4.

While I prefer to use two separate switches 77 and 78, a single three-point switch may be substituted if so desired. Also if desired, the low pressure cutout 65 may be omitted thus allowing the compressor 20 to operate continuously when freezing is desired regardless of the suction pressure. Also, while I have shown the mercury switch 78 as short-circuiting the mercury switch 56, it is to be understood that the switch 56 may be placed out of control in many other manners.

Instead of controlling the temperature of chamber 4 by adjusting a single controller, a plurality of temperature controllers may be employed, each of these controllers being set to maintain a different temperature, and these controllers being provided with a switch for selecting the desired controller to be placed in operation. I have indicated diagrammatically this arrangement in Figure 2. In this modification, a compressor motor 130 and an agitator motor 109 are connected by means of a wire 187 to line wire 188. A valve 140 corresponding to the valve 40 of Figure 1 is connected by a flexible element 172 with a switch carrying arm 170, the arrangement being identical with that illustrated in Figure 1. The switch carrier 170 carries two mercury switches 177 and 178, switch 178 being connected at one side to the agitator motor 109 by wire 195 and at its other side to line wire 180 by wires 196 and 181. The other side of the compressor motor 130 is connected by a wire 186 to mercury switch 164 of a high limit controller 160 which is similar to the controller 60 of Figure 1. The other terminal of the mercury switch 164 is connected by wire 184 to one terminal of a mercury switch 156 of a temperature controller 149. This temperature controller 149 corresponds to the controller 49 illustrated in Figure 1, the bulb 150 of such controller being located in the cabinet 4. Reference character 149a indicates a controller of the same type as the controller 149. This controller, however, is set to maintain a higher cabinet temperature than the temperature controller 149. The mercury switch 156a of controller 149a has one terminal connected to wire 184. Both controller 149 and controller 149a are therefore connected to wire 184. The other terminal of mercury switch 156 is connected by a wire 159 to a contact 161 of a double throw switch 162. The other contact 189 of switch 162 is connected to a terminal of mercury switch 156a by a wire 193. A switch arm 191 of the switch 162 is connected to the line wire 180 through wires 192 and 181.

Figures 2, 3:
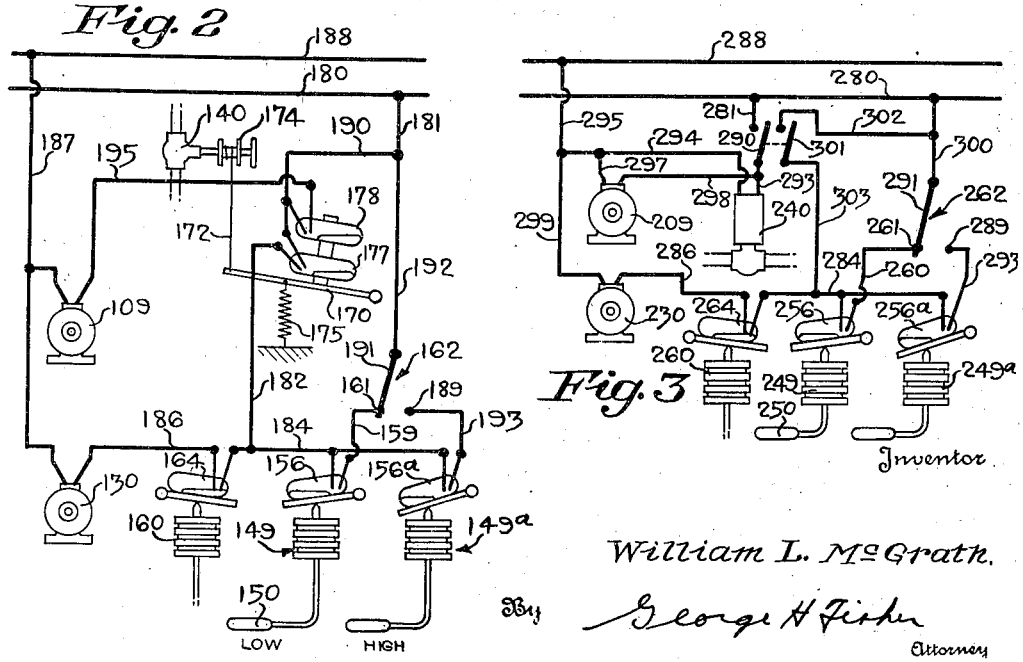
Figure 2 shows a wiring diagram of a modified form of the invention.
Figure 3 shows a wiring diagram of a still further form which the invention may take.

The operation of the system in Figure 2 is identical with that of Figure 1 except that either the temperature controller 149 or 149a may be placed in control of the compressor when the valve 140 is closed. When valve 140 is closed, the mercury switches 177 and 178 are tilted towards open position and the compressor motor is then under the control of either controller 149 or 149a depending upon the position of the switch arm 191. If the switch arm 191 is placed on contact 161, an operating circuit is established through the low temperature controller 152, this circuit commencing at line wire 180 and passing through wire 181, wire 192, switch arm 191, contact 161, wire 159, mercury switch 156, wire 184, mercury switch 164, wire 186, compressor motor 130 and wire 187 to line wire 188. With switch 191 in this position the compressor will be operated to maintain a relatively low temperature in the cabinet 4, this temperature being sufficiently low to cause hardening of the ice cream therein. If hardening has taken place and it is desired to increase the temperature in the hardening cabinet, switch arm 191 is moved from contact 161 to contact 189. This places the low temperature controller 149 out of operation and places high temperature controller 149a in control of the compressor.

Should it be desired to place the freezing cabinet into operation, valve 140 will be opened thus causing closure of switches 177 and 178 thereby causing operation of the agitator motor 109 and shunting out the temperature controllers 149 and 149a. As in the case of Figure 1, when the temperature controllers are shunted out, the high limit controller 160 nevertheless remains in control of the pump. While I have not shown a low side limit controller in Figure 2, it is to be understood that such controller may be employed if desired.

Instead of employing a manually operable valve for controlling the flow of refrigerant into the freezing evaporator, I may employ a solenoid valve and operate this valve by means of a switch which is mechanically connected to a switch for shunting out the temperature controllers. This arrangement I have illustrated in Figure 3. In this figure reference character 240 designates a solenoid or other type of electrically actuated valve for the freezing evaporator 5. This valve is preferably arranged so that when energized, it opens, and closes upon deenergization. In control of this valve is a switch 290. One side of this switch is connected by a wire 281 to line wire 280. The other side of the switch is connected to one terminal of solenoid valve 240 by means of a wire 293. The other terminal of the solenoid valve is connected by wires 294 and 295 to the other line wire 288. The switch 290 also controls the energization of the agitator motor 209, this motor being connected at one side to line wire 288 by means of wires 295, 294 and 297. The other terminal of the motor 209 is connected to switch 290 through wires 298 and 293. It will be seen, therefore, that the solenoid valve 240 and the agitator motor are connected in parallel and are simultaneously energized upon closure of switch 290.

The reference character 230 indicates the compressor motor, this motor being connected at one side to line wire 288 through wires 295 and 299. The other side of the compressor motor 230 is connected by a wire 286 to one terminal of the mercury switch 264 of the high limit controller 260. The other side of this mercury switch is connected by a wire 284 to one terminal each of the mercury switches 256 and 256a of the low and high temperature controllers 249 and 294a respectively. The other terminals of these mercury switches are as in Figure 2, connected to the contacts 261 and 289 of the selector switch 262 by means of wires 260 and 293. The switch arm 291 of the switch 262 is connected to line wire 280 by means of wire 300. Thus, as in the case of Figure 2 a high or low temperature may be maintained in the cabinet 4 by adjusting switch arm 291 to the appropriate contact. In order to place the temperature controllers 252 or 252a out of operation when the valve 240 is opened, I have illustrated a switch 301 which is mechanically connected to the switch arm 290. This switch arm is arranged to open and close simultaneously with switch 290. One side of the switch 301 is connected to wire 300 by means of a wire 302, the other side of said switch being connected to the wire 284 by means of a wire 303. The switch 301 when closed, therefore, acts to short-circuit whichever temperature controller that happens to be placed in operation by switch 291. As the switches 290 and 301 are actuated simultaneously, it will be seen that closure of these switches acts to simultaneously open the valve 240, energize the agitator motor 209, and shunt out the temperature control means 149 or 149a, thus placing the system in operation for effecting freezing in the freezing chamber 3.

From the foregoing, it is to be seen that operation of switch 291 serves to control the temperature in the hardening and storage cabinet so as to selectively maintain a temperature therein which is suitable for storage, or a lower temperature which is suitable for hardening. In other words, switch 291 acts to shift the system from storage operation to hardening operation. As before stated, switches 290 and 301 when actuated together shift the system from hardening or storage operation to freezing operation. Therefore, if desired, switches 290, 301, and 291 may be actuated by a single controller which is arranged upon movement thereof in one direction to first shift switch 291 from storage position to hardening position and upon further movement in the same direction to shift switches 290 and 301 from open position to closed position thereby placing the system in freezing operation. By such an arrangement, a single controller may be utilized for selectively placing the system in freezing, hardening, or storage operation.

In large systems, it may be desirable to provide the freezing chamber with a temperature controller, such controller acting to control the compressor to maintain the proper freezing temperature in the freezing cabinet whenever switches 290 and 301 are in freezing position. If such is desired, a temperature controller similar to controller 249, the control bulb of which is placed in chamber 3, may be interposed in wire 302. With such an arrangement, control of the compressor would be returned to controller 249 or 249a whenever the temperatures in the freezing compartment becomes sufficiently low. Also, if desired, such controller may be arranged to control the solenoid valve simultaneously with the compressor, to prevent flow of refrigerant into the evaporator of chamber 3 whenever the temperature therein is sufficiently low.

From the foregoing, it will be seen that in order to change the operation of the system from storage or hardening operation to freezing operation, three steps are necessary, these steps being (1) opening of the control valve; (2) the placing of the compressor in continuous operation; and (3) the placing of the agitator motor into operation. It will be further observed that by the arrangement shown herein, these three steps are simultaneously performed by the actuation of a single control member. My invention, therefore, provides a unitary and fool-proof controller for changing over from storage or hardening operation to freezing operation or the reverse thereof, this controller acting to properly place the refrigeration system in operation to carry the freezing load and to energize the agitator motor simultaneously. It will also be seen that I have provided a simple arrangement by which the temperature maintained in the hardening or storage cabinet may be controlled.

While in the preferred embodiments of my invention, I have illustrated a compressor controller responsive to the temperature of the hardening cabinet, it will be apparent that other controllers may be employed. For instance, if desired, a pressure controller responsive to the low side pressure could be utilized, such controller being set to maintain a back pressure on the evaporating coil 15 which is sufficiently low to maintain such coil at the desired temperature.

Furthermore, while I have illustrated my invention as applied to a compression refrigeration system, it is obvious that it is also applicable to other types of systems. Also, my invention it not limited to ice cream manufacturing and storage apparatus, but is applicable wherever it is desired to control a plurality of cooling units of a single cooling system.

It will be appreciated that many other modes in which may invention may be practiced will be apparent to those skilled in the art. Therefore, I do not wish to be limited other than by the scope of the appended claims and the prior art.

I claim as my invention:

1. In a refrigeration system, a first evaporator and a second evaporator, means for supplying refrigerant to said evaporators, control means for placing the first of said evaporators in or out of operation, said control means being independent of the condition of said first mentioned evaporator, means for controlling said supplying means to meet the requirements of the second evaporator, and means actuated with said first mentioned control means for placing said controlling means out of operation when the first evaporator is placed in operation.

2. In a refrigeration system, in combination, a first evaporator, and a second evaporator, means common to said evaporators for supplying refrigerant thereto simultaneously, a cut-off valve for one of said evaporators, means for controlling the refrigerant supplying means in accordance with the requirements of the other evaporator, and a controller for opening said valve and placing said controlling means out of operation.

3. In a refrigeration system, in combination, a first evaporator, a second evaporator, means common to said evaporators for reducing the back pressure thereof, a cut-off valve for one of the evaporators, means for controlling the back pressure reducing means in accordance with the requirements of the other evaporator, and a controller independent of the condition of said first mentioned evaporator for opening said valve and placing said controlling means out of operation.

4. In a refrigeration system, in combination, a first evaporator, a second evaporator, means for causing refrigerant to enter and evaporate simultaneously in both of said evaporators, a control valve for the first evaporator, means for limiting the operation of said first mentioned means to the requirements of said second evaporator, means for causing actuation of said valve, and means actuated with said last mentioned means for controlling the effect of said limiting means.

5. In a refrigeration system, in combination, a compressor, a first evaporator, a second evaporator, said evaporators being connected to said compressor, a cut-off valve for said second evaporator, means for controlling the compressor in accordance with the requirements of said first evaporator, and means actuated by an opening movement of said cut-off valve for operating said compressor independently of said controlling means.

6. In a refrigeration system, in combination, a first evaporator, a second evaporator, means to cause refrigerant to enter and evaporate simultaneously in both of said evaporators, a control valve for the first evaporator, control means for controlling said first mentioned means in accordance with the requirements of said second evaporator, and means for actuating said valve and controlling said control means.

7. In a refrigeration system, in combination, a first evaporator, a second evaporator, means to cause refrigerant to enter and evaporate simultaneously in both of said evaporators, a remotely actuated control valve for the first evaporator, control means for controlling said first mentioned means in accordance with the requirements of said second evaporator, means for placing said control means in and out of operation, and means actuated with said last mentioned means for actuating said control valve.

8. In a refrigeration system, in combination, a plurality of evaporators connected to a common actuating device for simultaneous action of both of said evaporators, means for controlling said device to meet the requirements of one of said evaporators, control means for the other evaporator, said latter control means being connected to control the effect of said first controlling means.

9. In a refrigeration system, in combination, a plurality of evaporators connected to a common actuating device for simultaneous action of both of said evaporators, means for controlling said device to meet the requirements of one of said evaporators, and control means for one of said evaporators acting also to control the effect of said first mentioned control means.

10. In a refrigeration system, in combination, a first evaporator, a second evaporator, means for causing refrigerant to enter and evaporate in said evaporators, means for controlling said last mentioned means in accordance with the requirements of said first evaporator, said controlling means comprising a first controller, a second controller, and selective means for placing either controller in operation, and means for placing said second evaporator in operation and for placing said controlling means out of operation.

11. In a combined freezing, hardening, and storage system, a freezing evaporator, a storage or hardening evaporator, means common to said evaporators for supplying refrigerant thereto, means for controlling the flow of refrigerant into the storage or hardening evaporator in accordance with the requirements thereof, a control valve for the freezing evaporator, means for controlling said refrigerant supplying means in accordance with the requirements of the hardening evaporator, an agitator associated with the freezing evaporator, and means for controlling said valve, said refrigerant supply controlling means, and said agitator, said means acting to place said last mentioned controlling means out of operation, to place the agitator in operation, and to open the control valve.

12. In a combined freezing, hardening, and storage system, a freezing evaporator, a storage or hardening evaporator, means common to said evaporators for reducing the back pressure thereof, means for controlling the flow of refrigerant into the storage or hardening evaporator in accordance with the requirements thereof, a control valve for the freezing evaporator, means for controlling the back pressure reducing means to maintain the required temperature in the storage or hardening evaporator, an agitator associated with the freezing evaporator, and means for controlling said valve, said back pressure controlling means, and said agitator, said means acting to place the back pressure controlling means out of operation, to place the agitator in operation, and to open said control valve.

13. In a combined freezing, hardening, and storage system, a freezing evaporator and a hardening and storage evaporator, a compressor connected to said evaporator, a control valve for the freezing evaporator, an agitator associated with said freezing evaporator, means responsive to the temperature at the second mentioned evaporator for controlling the operation of the compressor, said means comprising two controllers and selective means for placing either controller in operation, and means for controlling said valve, said agitator, and said compressor controlling means, said means acting to place the compressor controlling means out of operation and to place the agitator in operation when the valve is opened a predetermined extent.

14. In a refrigeration system, in combination, a first evaporator, a second evaporator, a compressor connected to said evaporators, a control valve for one of the evaporators, means for controlling the compressor in accordance with the requirements of the other evaporator, limit control means for said compressor, and means for controlling said valve and said first mentioned compressor controlling means, said means acting to place the first mentioned compressor controlling means out of operation when said valve is opened a predetermined extent, while leaving said limit control means in control of the compressor.

15. In combination, a freezing chamber, a cooling coil associated therewith, an agitator in said freezing chamber, valve means for controlling the operation of said cooling coil, and means actuated thereby for controlling the operation of said agitator.

16. In combination, a first coil, a second coil, common fluid supplying means for said coils, means for controlling said supply means in accordance with the requirements of one of said coils, a control valve for the other coil, and means for controlling said valve and said supply controlling means, to place the supply controlling means out of operation when the control valve is opened a predetermined extent.

17. In combination, a first cooling coil, a second cooling coil, common cooling fluid supplying means for said coils, a control valve for one of the coils, means for controlling the supplying means in accordance with the requirements of the other cooling coils, and means for actuating said control valve and for substantially simultaneously placing said supply controlling means into or out of operation, said actuating means acting to open the valve and place the supply control means out of operation, or to close the valve and place said supply controlling means in operation.

18. In a combined freezing, storage, and hardening unit, a freezing chamber, a hardening and storage chamber, a cooling coil in the freezing chamber, a cooling coil in the storage and hardening chamber, common cooling fluid supplying means for said coils, a control valve for the freezing coil, means responsive to the temperature in the storage and hardening chamber for controlling the fluid supplying means, an actuating device for said control valve and means associated with said device for placing said temperature control means out of operation when the valve is opened, and for placing said control means in operation when the valve is moved towards closed position.

19. In a system of the class described, in combination, a first compartment to be chilled, a second compartment to be chilled, a common refrigeration system for supplying cooling medium to said compartments for effecting chilling thereof, means for controlling the supply of cooling medium in accordance with the cooling requirements of one of said compartments, means for selectively placing the other of said compartments into or out of operation, and means actuated with said last mentioned means for placing said cooling medium supply control means out of operation when said second compartment is placed into operation.

20. In a system of the class described, in combination, a first compartment to be chilled, a second compartment to be chilled, a common refrigeration system for supplying cooling medium to said compartments for effecting chilling thereof, means for controlling the supply of cooling medium in accordance with the cooling requirements of one of said compartments, means for selectively placing the other of said compartments into or out of operation, and means actuated with said last mentioned means for controlling the effect of said cooling medium supply control means.

21. In a system of the class described, in combination, a first cooling device, a second cooling device, means connecting said devices in parallel with a common cooling fluid supply means, means for controlling the flow of cooling fluid through one of said cooling devices, means for controlling said cooling fluid supplying means in accordance with the cooling requirements of the other of said cooling devices, and means actuated with said first mentioned controlling means for controlling the action of said second mentioned controlling means.

22. In a system of the class described, in combination, a first cooling device, a second cooling device, means connecting said devices in parallel with a common cooling fluid supply means, means for controlling the flow of cooling fluid through one of said cooling devices, means for controlling said cooling fluid supply means, and means actuated with one of said controlling devices for controlling the action of the other of said controlling devices.

23. In a combined freezing, hardening, and storage system, a freezing evaporator, a storage or hardening evaporator, common compressor means connected to said evaporators, control means for limiting the output of said compressor means in accordance with the requirements of said storage or hardening evaporator, an agitator associated with said freezing evaporator, and a controller associated with said control means and said agitator, said controller being arranged for placing said agitator out of operation and for placing said control means in operation when said controller is in one position, while placing said agitator in operation, and rendering said control means incapable of limiting the compressor output to the requirements of said storage or hardening evaporator when said controller is in another position.

WILLIAM L. McGRATH.